Sept. 2, 1952    M. H. R. J. PLUSJE    2,609,271
PRODUCTION OF CALCIUM PHOSPHATES AND CALCIUM NITRATE
Filed July 31, 1947                                 2 SHEETS—SHEET 2

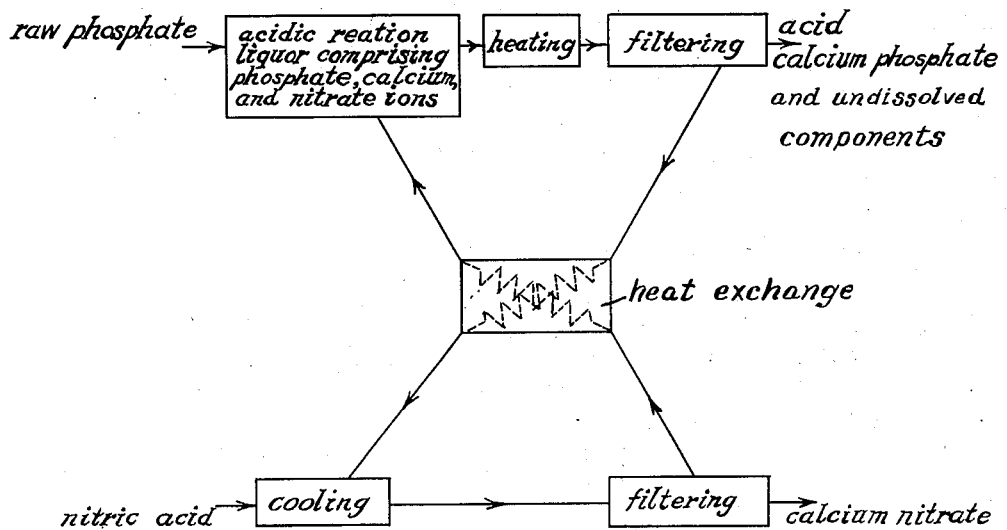
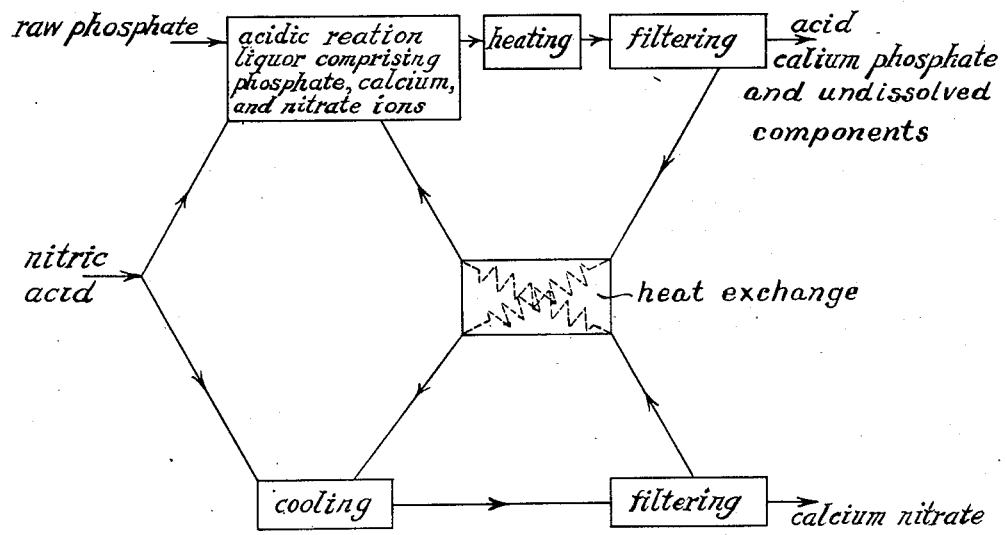

Inventor
*Mathijs H.R.J.Plusje*
By Cushman, Darby & Cushman
Attorneys

Patented Sept. 2, 1952

2,609,271

UNITED STATES PATENT OFFICE 2,609,271

PRODUCTION OF CALCIUM PHOSPHATES AND CALCIUM NITRATE

Mathijs H. R. J. Plusje, Beek, Netherlands, assignor to De Directie van de Staatsmijnen in Limburg, Heerlen, Netherlands Application July 31, 1947, Serial No. 765,155
In the Netherlands September 25, 1941

4 Claims. (Cl. 23—102)

This invention relates to the production of calcium phosphates and calcium nitrate from raw phosphate materials, and more particularly it is concerned with the efficient production of acid calcium phosphates and calcium nitrate, principally for use as fertilizer ingredients.

Theoretically, raw phosphate materials composed predominantly of tricalcium phosphate may be decomposed by the action of nitric acid to form phosphoric acid, monocalcium phosphate, or dicalcium phosphate according to the following formulae:

(1)
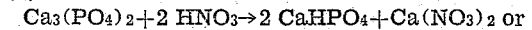
$$Ca_3(PO_4)_2 + 2\ HNO_3 \rightarrow 2\ CaHPO_4 + Ca(NO_3)_2\ \text{or}$$
(2)
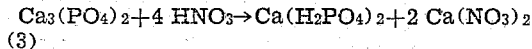
$$Ca_3(PO_4)_2 + 4\ HNO_3 \rightarrow Ca(H_2PO_4)_2 + 2\ Ca(NO_3)_2$$
(3)
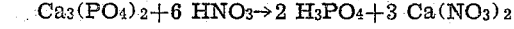
$$Ca_3(PO_4)_2 + 6\ HNO_3 \rightarrow 2\ H_3PO_4 + 3\ Ca(NO_3)_2$$

While all three of the reactions indicated above are theoretically possible, the successful commercial production of soluble calcium phosphates has been possible heretofore only by the use of a considerable excess of acid over the stoichiometric amounts indicated by the formula. Thus, it has always been found necessary heretofore, as far as I am aware, to decompose the raw phosphate material with a large excess of nitric acid, e. g., for the manufacture of dicalcium phosphate considerably more than a 2 molar proportion and for the preparation of monocalcium phosphate considerably more than a 4 molar proportion has always been necessary. In many cases, more than a 6 molecular proportion is used. In order to obtain the desired acid calcium phosphate, i. e., the mono- or dicalcium phosphate, it is necessary to neutralize the acidic reaction mixture resulting from decomposition with this large excess of acid. As a result, it has been necessary in the past in commercial operations to use more nitric acid than corresponds to the theoretical reactions represented by Formulae 1 or 2 above, and to produce large quantities of byproduct materials, which are generally less desirable than the required acid calcium phosphates. Hence, a method of forming acid calcium phosphate from raw tricalcium phosphate material which requires the use of only a minimum of decomposing acid is desirable.

A principal object of this invention is the provision of new processes for the production of acid calcium phosphates and calcium nitrate from raw phosphate materials. A further object is the provision of such processes which employ the reactions represented by Formulae 1 or 2 above, so as to use only a minimum amount of acid with the production of a maximum amount of acid phosphates. A still further object is the provision of such procedures in which acid phosphates are produced without recourse to a neutralization step. Another object is the provision of a cyclic process for the production of acid phosphates from raw phosphate materials and nitric acid which may be operated in continuous fashion.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

These objects are accomplished according to the procedure of the present invention by affecting the treatment of the raw phosphate material to be transformed into acid calcium phosphates and calcium nitrate with an acidic reaction liquor containing calcium, phosphate and nitrate ions which has been obtained from a previous operation of the cyclic procedure. The procedure involves a cycle of four fundamental steps comprising:

(1) The treatment of raw phosphate material with the indicated acidic reaction liquor.

(2) In addition to the reaction mixture of an amount of nitric acid corresponding to between about two and four mols of the acid for each mol of tricalcium phosphate in the treated raw phosphate material, plus an additional quantity of the acid to compensate for acid reacting with impurities in the raw phosphate.

(3) Elimination from the reaction mixture of monocalcium phosphate or dicalcium phosphate or a mixture of these materials in an amount which corresponds substantially to the phosphate content contained in the raw phosphate material treated as in step 1 above.

(4) Elimination of calcium nitrate from the reaction mixture to produce an acidic reaction liquor substantially corresponding in composition to the acidic reaction liquor used in the treatment of the raw phosphate material as in step 1 above.

The decomposition step and the phosphate precipitation step are preferably carried out at elevated temperatures, while the nitrate precipitation step 4 is preferably carried out in the cold, e. g., in the neighborhood of 0 to 25° C.

The procedure of steps and manner of operation of the present invention may be more readily comprehended by reference to the attached drawings in which:

Figure 1 is a flow diagram of one scheme of operation of this invention.

Figure 2 is a flow diagram of a modified scheme of operation of the procedure of this invention.

in which all phases are in equilibrium at 25° C.

Figure 3:
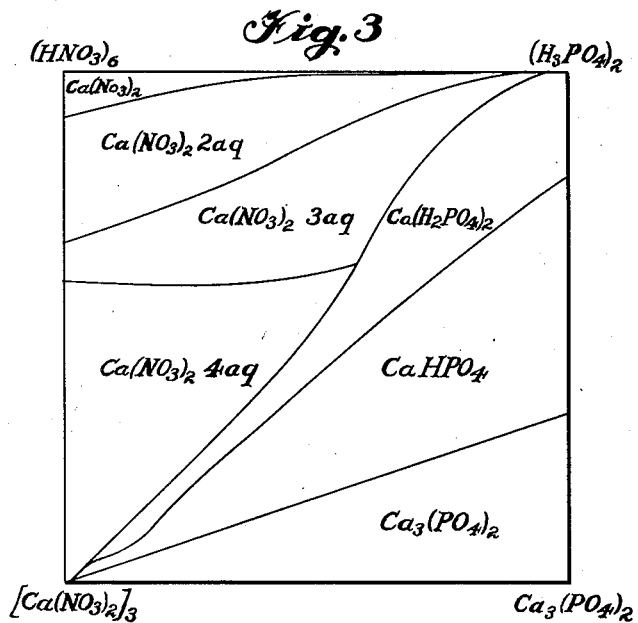
Figure 3 is an equilibrium phase diagram of the system $$Ca_3(PO_4)_2 - H_3PO_4 - HNO_3 - Ca(NO_3)_2 - H_2O$$
Figure 4:
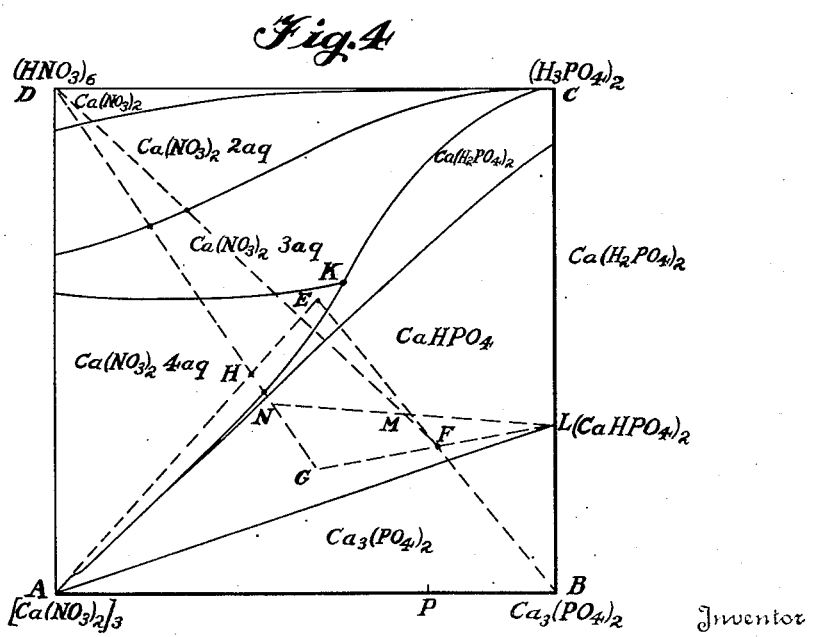

Figure 4 is an equilibrium phase diagram similar to the diagram of Figure 3, but in which the calcium nitrate areas are shown at equilibrium at 25° C., while the areas for the phophates are shown at equilibrium at 100° C. The illustration also shows in dotted lines the composition changes in the reaction mixtures which take place during the operation of the present process.

Referring in detail to Figures 1 and 2, it will be observed that several different schemes of operation of the present process are possible. The scheme of operation illustrated in Figure 1, hereinafter referred to as scheme A, is preferred because it makes possible the production of calcium nitrate which is free from phosphates. As will be observed from the flow diagram, raw phosphate material is first treated with an acidic reaction liquor which results from the operation of the process. This mixture of phosphate and liquor is then heated sufficiently to complete the decomposition of the phosphate according to the reactions given hereinbefore and to cause the crystallization or precipitation of acid calcium phosphates from the reaction mixture. The precipitated phosphates are removed from the reaction mixture such as by filtration or centrifuging.

The hot acid mixture, from which the precipitated acid phosphate has been removed, is then passed through a heat exchanger to reduce the temperature of the mixture to about room temperature. Before introducing the acid liquor into the heat exchanger, a small amount of nitric acid may be added to prevent monocalcium phosphate from crystallizing during the cooling. Next, all of the nitric acid which is necessary for the operation of one cycle of the process is added to the cooled mixture. The addition of acid in conjunction with the reduction of temperature, causes calcium nitrate to be crystallized out or precipitated from the reaction mixture. The prepared nitrate is removed, e. g., by filtration, after which the supernatant liquor is passed through the heat exchanger to the original step of the process for treatment of further raw phosphate material.

The scheme of operation illustrated in Figure 2, hereinafter referred to as scheme B, is similar to the scheme A with the exception that a portion of the total of the acid used for the completion of one cycle is added to the acidic reaction liquor during the primary step of the operation of the treatment of raw phosphate material.

It will be appreciated that my process can be operated in step-wise fashion. However, one of the main advantages of the process is the fact that it may be operated in wholly continuous fashion so that the raw materials and products are continuously added and withdrawn, while the reaction mixture flows through the reaction vessels.

The mode of operation of the process of this invention may be more readily comprehended by reference to the following illustrative examples in which all parts are by weight.

Example I

This example illustrates the operation of scheme A, discussed above, for the treatment of raw phosphate material having a composition of 30.8% $P_2O_5$, 49.7% CaO and 11.4% $CO_2$ with 56% nitric acid.

An acidic reaction liquor is produced by heating together 815 parts of the raw phosphate and the 1890 parts of the nitric acid. This reaction mixture is then cooled down to 10° C. with the result that 1180 parts of calcium nitrate tetrahydrate are crystallized out and filtered off from the mixture.

400 parts of raw phosphate material are then mixed with the acidic reaction liquor comprising the filtrate from the above operation. This mixture is heated for one hour at 120° C. with the elimination of water by evaporation. 240 parts of dicalcium phosphate have then separated from the mixture and are removed by filtration. 405 parts of nitric acid are added to the supernatant liquor which is then cooled down to 10° C. The cooling causes 430 parts of calcium nitrate tetrahydrate to crystallize out from the reaction mixture. The crystallized nitrate is removed by filtration and the supernatant acidic reaction liquor is used for the treatment of further raw phosphate in another cycle of the procedure.

Example II

This example illustrates the use of scheme B, discussed above, for the treatment of raw phosphate material having the following composition: 25.5% $P_2O_5$, 49.5% CaO and 13.7% $CO_2$.

535 parts of this raw phosphate material are mixed with 945 parts of 53% nitric acid. This mixture is heated for one hour at 50° C., after which the temperature of the mixture is increased to the boiling point. The mixture is maintained at the boiling point with the evaporation of water until 100 parts of dicalcium phosphate have been precipitated and filtered off from the heated solution. Thereafter 150 parts of nitric acid are added to the supernatant liquor which is then cooled down to 15° C. This cooling operation causes 250 parts of calcium nitrate tetrahydrate to crystallize out of the reaction mixture. The crystallized nitrate is filtered off, and an acidic reaction liquor is obtained. To this liquor is then added 200 parts of raw phosphate material and 100 parts of nitric acid and the cycle is repeated.

Example III

This example illustrates a case of the use of scheme A in which raw phosphate of the composition 34.2% $P_2O_5$ and 50% CaO is treated with nitric acid of 57.2% concentration.

A mixture of 550 parts of the raw phosphate and 1395 parts of the nitric acid are heated for one-half hour at 80° C. The reaction mixture is then cooled down to 5° C. with the result that 855 parts of calcium nitrate tetrahydrate are crystallized from the mixture. The crystallized nitrate is removed by filtration after which 175 parts of raw phosphate material are added to the supernatant acidic reaction liquor. The mixture of raw phosphate and liquor is heated to 100° C. for three-quarters of an hour, during which time 25 parts of water are evaporated. This mixture is then cooled to 40° C. with the result that 105 parts monocalcium phosphate crystallize from the reaction liquor. After filtration of the precipitated phosphate, 250 parts of nitric acid are added to the supernatant liquor. This mixture is then cooled to 5° C. causing 265 parts calcium nitrate tetrahydrate to be crystallized from the mixture. Separation of the crystallized nitrate produces a supernatant acidic mother liquor which is used for the further treatment of 175 parts raw phosphate material in a further operation of the cyclic procedure.

It will be apparent to those skilled in the art, from the description given hereinbefore and the three specific examples above, that various proportions of reaction materials and compositions may be employed in the successful operation of my procedure. The exact proportions of acid used in the treatment of any particular phosphate material may be readily calculated according to known methods by operating the reaction conditions as set forth hereinbefore. In this connection, the general principles involved and the dependence of the successful operation of our processes on the material compositions are illustrated in the Figures 3 and 4.

These figures show the system

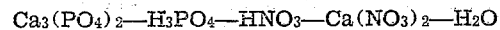

Ca$_3$(PO$_4$)$_2$—H$_3$PO$_4$—HNO$_3$—Ca(NO$_3$)$_2$—H$_2$O for a given temperature and pressure (in this case atmospheric pressure) in the manner usual for reciprocal couples of salts. The abscissa of the diagrams are expressed in the following units:

$$x = \frac{Ca_3(PO_4)_2}{[Ca(NO_3)_2]_3 + Ca_3(PO_4)_2} = \frac{(H_3PO_4)_2}{(H_3PO_4)_2 + (HNO_3)_6}$$

while the ordinates of the diagrams are in the following units:

$$y = \frac{(HNO_3)_6}{[Ca(NO_3)_2]_3 + (HNO_3)_6} = \frac{(H_3PO_4)_2}{Ca_3(PO_4)_2 + (H_3PO_4)_2}$$

The coordinate for the water content is set in perpendicularly to the drawing plane forming a space figure for the solutions of varying water composition.

The lines representing in this space figure the equilibria between three phases (two solid phases, one liquid phase) are projected on the basal area, i. e., the drawing plane. The projections subdivide the figures into areas, each of which corresponds to the appearance of a certain solid phase, in equilibrium with a solution. Figure 3 shows the equilibrium at 25° C., while Figure 4 shows the calcium nitrate areas at 25° C., and the areas for di- and tricalcium phosphate at 100° C.

A cyclic process according to this invention, in which pure tricalcium phosphate is decomposed at 100° C., and calcium nitrate is separated by cooling to 25° C. is illustrated in Figure 4 by a quadrangle E F G H. This quadrangle relates to the way of carrying out the process, in which the whole amount of nitric acid required by one period of the cycle is added after the removal of the acid calcium phosphate and before the separation of the calcium nitrate (scheme A as is illustrated in Figure 1).

To a solution E in the calcium nitrate area there is added an amount of tricalcium phosphate, to form a mixture of an overall composition indicated by F. When F is situated in the monocalcium phosphate area, which is the case when comparatively small amounts of tricalcium phosphate are added, monocalcium phosphate always separates out after the decomposition eventually after cooling and/or concentrating. If, however, dicalcium phosphate must be prepared, a larger amount of tricalcium phosphate is added to place the composition F in the dicalcium phosphate area.

A quantity of mono- or dicalcium phosphate is separated from the reaction mixture which corresponds to the quantity of tricalcium phosphate added to composition E. The remaining mixture will then have an over all composition represented by G.

Nitric acid is now added to the reaction mixture in an amount which corresponds to the quantity of tricalcium phosphate added in E, i. e., sufficient nitric acid to produce a composition represented in the diagram by point (H) in the calcium nitrate area. Thereupon the mixture is cooled to 25° C. The separation of calcium nitrate brings the situation back to the starting point E.

The calcium nitrate is preferably separated as a hydrate, because in this way the water-balance of the cycle can most easily be maintained since the nitric acid carries water into the cycle and there frequently occurs a liberation of water in the decomposition reaction. Moreover, the water which has been used before for washing the separated dicalcium phosphate may be added. When using moderate concentrations of nitric acid and quantities of water for washing, the water supply may for the greater part be compensated for by separating the calcium nitrate as a tetrahydrate, so that only relatively small amounts of water must be evaporated. For separating the calcium nitrate as a tetrahydrate, point E must be situated within the tetrahydrate area.

The construction of a quadrangle corresponding to the cycle in the diagram may be used in choosing the several proportions of mixing. If one intends to separate calcium nitrate as a tetrahydrate, one starts with composition corresponding to the point E in the tetrahydrate area, preferably near the quadruple point K. The point F is chosen on the line E B according to the preceding directives. When F is situated in the monocalcium phosphate area, monocalcium phosphate is obtained. When F is situated in the dicalcium phosphate area, and a sufficient amount of tricalcium phosphate is added, dicalcium phosphate is obtained.

When dicalcium phosphate must be produced, the proportions of ingredients employed in the reaction should be chosen in the following manner. Point F is connected to L (L=dicalcium phosphate). While point G is situated on the line LF so that the segment HG equals the segment HE. Lastly, H is the point of intersection of lines AE and DG. In quite the same way points G and H can be constructed in the case of monocalcium phosphate.

As a matter of fact, G should not be situated in the calcium nitrate area. In the case of preparing dicalcium phosphate G should not be situated in the monocalcium phosphate area. E and F should be chosen so that G is situated in the desired area.

The above description and Figure 4 relate to the case in which a pure tricalcium phosphate is used. However, when raw phosphate material is treated, one will use in the diagram a point on the line AB, e. g., point P, instead of B, corresponding to the proportion CaO:P$_2$O$_5$ in the raw phosphate.

When using scheme B as illustrated in Figure 1, in which nitric acid is partly added simultaneously with the raw phosphate, in preparing dicalcium phosphate, a cycle like that represented by the polygon E F M N H would be involved. Nitric acid is added to the compositions corresponding to the points F and N. M is situated on line FD, and N is situated on line LM. In this case it is not necessary to have F situated within the dicalcium phosphate area, but M and N should be.

When the raw phosphate is decomposed at a higher temperature, it is advantageous, especially when G or N are situated near the line monocalcium phosphate/dicalcium phosphate, to effect the separation of the dicalcium phosphate at an elevated temperature since cooling might give rise to the separation of a monocalcium phosphate containing dicalcium phosphate.

In the preceding paragraphs, the process has only been discussed on the basis of the equilibrium diagrams for 25° C. and 100° C. Directions can, however, also be taken from these diagrams in case other temperatures are used. For this purpose attention must be paid to the displacements of the equilibrium lines with the temperature. These displacements can readily be determined by a technician using established methods.

The line tricalcium phosphate/dicalcium phosphate is almost independent of the temperature. The line dicalcium phosphate/monocalcium phosphate is nearly a straight line and turns with increased temperature round a point in the neighborhood of point A as shown in the figures. The line monocalcium phosphate/calcium nitrate is only affected to a small degree by alterations of the temperature.

It is of importance that the line tetrahydrate/trihydrate is displaced with decreased temperature in the direction to greater $y$. At 5° C., $y$ for this line is equal to between 0.85 to 0.87. It is possible to improve the heat economy of the process by exchange of heat between the mixtures which are to be heated or cooled by counter-current flow.

Various types of materials containing calcium and phosphates in appreciable quantities may be used in carrying out the present process. Obviously, materials in which the calcium and phosphate content are high are preferred.

Examples of suitable materials for this purpose are Florida pebble or plate rock phosphate, Canadian apatite, Tennessee brown rock phosphate, Curacao phosphate, Makatea phosphate, and similar natural products. Likewise, mixtures of the materials may be used or synthetically produced or by-product calcium phosphate products or mixtures thereof may be utilized. Such materials have been referred to throughout the specification and in the appended claims as raw phosphate materials.

I claim:

1. A cyclic process for the production of acid calcium phosphates and calcium nitrate from raw phosphate material and nitric acid, which comprises the successive steps: dissolving raw phosphate material in a circulating acidic mother liquor comprising a substantial amount of residual added nitric acid and calcium and phosphate ions; precipitating a material of the group consisting of monocalcium phosphate, dicalcium phosphate or mixtures thereof from the reaction mixture by boiling off water from the mixtures; separating and withdrawing from the supernatant solution the precipitated material and insoluble impurities present in the raw phosphate material, the amount of precipitated material so withdrawn being such that, for each mol of tricalcium phosphate dissolved in the mother liquor, the corresponding amount of acid calcium phosphate is withdrawn from the solution; adding to the solution 2-4 mols of nitric acid for each mol of tricalcium phosphate present in said raw phosphate material, plus an additional quantity of nitric acid to compensate for acid reacting impurities present in the phosphate material; precipitating calcium nitrate tetrahydrate from the solution by cooling to a temperature in the range of 0° to 25° C.; separating and withdrawing the precipitated nitrate from the supernatant acidic liquor, the amount of calcium nitrate so withdrawn from the circulating mother liquor substantially corresponding to the amount of nitric acid added to the mother liquor; and repeating the process by using the separated supernatant acidic liquor to treat a fresh quantity of raw phosphate material.

2. A process according to claim 1, characterized in that the raw phosphate material and the nitric acid are continuously added to the circulating acidic liquor, while the acid calcium phosphate and calcium nitrate are continuously withdrawn, whereby the entire process is rendered continuous.

3. A cyclic process for the production of acid calcium phosphates and calcium nitrate from raw phosphate material and nitric acid which comprises the successive steps of: dissolving raw phosphate material in a circulating acidic mother liquor comprising a substantial amount of residual added nitric acid and calcium and phosphate ions; precipitating a material of the group of monocalcium phosphate, dicalcium phosphate or mixtures thereof from the reaction mixture in an amount corresponding with the $P_2O_5$ present in the added raw phosphate material by boiling off water from the mixture; separating and withdrawing from the supernatant solution the precipitated material and the insoluble impurities present in the raw phosphate material; adding nitric acid to the separated supernatant solution; precipitating calcium nitrate tetrahydrate from the solution by cooling to a temperature in the range of 0° to 25° C.; separating and withdrawing the precipitated nitrate from the supernatant acidic liquor, the amount of calcium nitrate so withdrawn from the solution substantially corresponding to the amount of added nitric acid; adding a further quantity of nitric acid to the separated supernatant acidic liquor, whereby the total quantity of nitric acid added during each cycle to the circulating liquor amounts to 2-4 mols of nitric acid for each mol of tricalcium phosphate present in the said raw phosphate material, plus an additional quantity of nitric acid to compensate for acid reacting impurities in the phosphate material; and repeating the process by adding a fresh quantity of raw phosphate material to the separated acidic liquor.

4. A process according to claim 3, characterized in that the separated supernatant solution is cooled by heat exchange with said separated acidic liquor prior to the addition of the nitric acid.

MATHIJS H. R. J. PLUSJE.

REFERENCES CITED

The following references are of record in the file of this patent:

UNITED STATES PATENTS

| Number | Name | Date |
| --- | --- | --- |
| 1,903,684 | Palazzo | Apr. 11, 1933 |
| 2,021,527 | Suchy et al. | Nov. 19, 1935 |

FOREIGN PATENTS

| Number | Country | Date |
| --- | --- | --- |
| 339,340 | Great Britain | Dec. 4, 1930 |
| 364,033 | Great Britain | Dec. 28, 1931 |
| 366,970 | Great Britain | Feb. 8, 1932 |
| 391,495 | Great Britain | May 1, 1933 |